(12) United States Patent
Taherzadeh Boroujeni et al.

(10) Patent No.: US 12,413,278 B2
(45) Date of Patent: Sep. 9, 2025

(54) CSI REPORT SETTING BY THE CSI-TRANSMITTING USER EQUIPMENT

(71) Applicant: QUALCOMM Incorporated, San Diego, CA (US)

(72) Inventors: Mahmoud Taherzadeh Boroujeni, San Diego, CA (US); Sony Akkarakaran, Poway, CA (US); Tao Luo, San Diego, CA (US); Juan Montojo, San Diego, CA (US); Junyi Li, Chester, NJ (US); Jung Ho Ryu, Fort Lee, NJ (US); Kapil Gulati, Montgomery, NJ (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 695 days.

(21) Appl. No.: 17/017,338

(22) Filed: Sep. 10, 2020

(65) Prior Publication Data

US 2021/0083740 A1    Mar. 18, 2021

Related U.S. Application Data

(60) Provisional application No. 62/899,617, filed on Sep. 12, 2019.

(51) Int. Cl.
*H04B 7/06* (2006.01)
*H04L 1/00* (2006.01)
(Continued)

(52) U.S. Cl.
CPC ......... *H04B 7/0626* (2013.01); *H04L 1/0003* (2013.01); *H04L 5/0051* (2013.01);
(Continued)

(58) Field of Classification Search
CPC ....... H04B 7/0626; H04B 1/00; H04W 76/27; H04W 24/08; H04W 72/02;
(Continued)

(56) References Cited

U.S. PATENT DOCUMENTS

2013/0322273 A1* 12/2013 Etemad .................. H04B 7/024
 370/252
2015/0043475 A1* 2/2015 Kim ...................... H04L 5/0037
 370/329

(Continued)

FOREIGN PATENT DOCUMENTS

EP         3370357 A1    9/2018
WO      2018022677 A1    2/2018
(Continued)

OTHER PUBLICATIONS

Ericsson: "PHY Layer Procedures for Sidelink", 3GPP Draft, 3GPP TSG-RAN WG1 Meeting #97, R1-1907143 Ericsson—Physical Layer Procedures for Sidelink, 3rd Generation Partnership Project (3GPP), Mobile Competence Centre, 650, Route Des Lucioles, F-06921 Sophia-Antipolis Cedex, vol. RAN WG1, No. Reno, US, May 13, 2019-May 17, 2019, May 13, 2019 (May 13, 2019), XP051728589, 13 pages, Retrieved from the Internet: URL: http://www.3gpp.org/ftp/Meetings%5F3GPP%5FSYNC/RAN1/Docs/R1%2D1907143%2Ezip.
(Continued)

*Primary Examiner* — Ian N Moore
*Assistant Examiner* — Latresa A McCallum
(74) *Attorney, Agent, or Firm* — Patterson & Sheridan LLP

(57) ABSTRACT

Some aspects provide a method for wireless communication by a first wireless device. The method generally includes transmitting control information regarding at least one of scheduling or configuration of a channel state information
(Continued)

(CSI) report to be transmitted by the first wireless device. The method generally includes generating the CSI report based on one or more CSI reference signals (CSI-RSs) received by the first wireless device. The method generally includes and transmitting the CSI report in accordance with the control information.

28 Claims, 10 Drawing Sheets

(51) Int. Cl.
| | |
|---|---|
| H04L 5/00 | (2006.01) |
| H04W 24/08 | (2009.01) |
| H04W 72/02 | (2009.01) |
| H04W 72/044 | (2023.01) |
| H04W 72/20 | (2023.01) |
| H04W 72/542 | (2023.01) |
| H04W 76/27 | (2018.01) |
| H04W 92/18 | (2009.01) |

(52) U.S. Cl.
CPC .......... *H04W 24/08* (2013.01); *H04W 72/02* (2013.01); *H04W 72/0473* (2013.01); *H04W 72/20* (2023.01); *H04W 72/542* (2023.01); *H04W 76/27* (2018.02); *H04W 92/18* (2013.01)

(58) Field of Classification Search
CPC .......... H04W 72/0473; H04W 72/085; H04W 72/1278; H04W 92/18; H04W 76/10; H04W 28/22; H04W 16/18; H04W 52/34; H04W 8/20; H04W 74/002; H04L 1/0003; H04L 5/0051; H04L 12/4013; H04L 41/145; H04L 43/00
See application file for complete search history.

(56) References Cited

U.S. PATENT DOCUMENTS

| | | | | |
|---|---|---|---|---|
| 2016/0330630 | A1* | 11/2016 | Yoo | H04L 5/0048 |
| 2017/0230937 | A1* | 8/2017 | Nguyen | H04W 88/06 |
| 2017/0366377 | A1* | 12/2017 | Papasakellariou | H04L 5/005 |
| 2018/0034611 | A1 | 2/2018 | Nagaraja et al. | |
| 2019/0190581 | A1 | 6/2019 | Zhang et al. | |
| 2020/0022089 | A1* | 1/2020 | Guo | H04B 17/327 |
| 2021/0028842 | A1* | 1/2021 | Kim | H04B 7/0628 |
| 2021/0282099 | A1* | 9/2021 | Osawa | H04L 5/0048 |
| 2022/0201502 | A1* | 6/2022 | Kang | H04B 7/08 |
| 2023/0179381 | A1* | 6/2023 | Rahman | H04L 5/0057 370/330 |

FOREIGN PATENT DOCUMENTS

| | | | | |
|---|---|---|---|---|
| WO | WO-2020012540 | A1 * | 1/2020 | .......... H04W 56/002 |
| WO | WO-2020220343 | A1 * | 11/2020 | |

OTHER PUBLICATIONS

Huawei, et al., "Sidelink CSI", 3GPP Draft, 3GPP TSG RAN WG1 Meeting #96bis, R1-1904688, vol. RAN WG1, No. Xi'an, China, Apr. 8, 2019-Apr. 12, 2019, Apr. 2, 2019 (Apr. 2, 2019), XP051707281, 6 Pages, Retrieved from the Internet: URL: http://www.3gpp.org/ftp/tsg%5Fran/WG1%5FRL1/TSGR1%5F96b/Docs/R1%2D1904688%2Ezip, [retrieved on Apr. 2, 2019], Sections 1-4.

International Search Report and Written Opinion—PCT/US2020/050296—ISAEPO—Nov. 12, 2020.

NTT Docomo, et al., "NR Sidelink Physical Layer Procedure", 3GPP Draft, 3GPP TSG RAN WG1 #97, R1-1906209 DCM SL PHY Procedure FIN, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051727663, 12 pages, Retrieved from the Internet: URL: http://www.3gpp.org/ftp/Meetings%5F3GPP%5FSYNC/RAN1/Docs/R1%2D1906209%2Ezip.

Samsung: "On Sidelink CSI Procedure", 3GPP Draft, 3GPP TSG RAN WG1 #97, R1-1906949, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051728399, 3 Pages, Retrieved from the Internet: URL: http://www.3gpp.org/ftp/Meetings%5F3GPP%5FSYNC/RAN1/Docs/R1%2D1906949%2Ezip [retrieved on May 13, 2019], p. 1, paragraph 2-p. 2.

* cited by examiner

CSI REPORT SETTING BY THE CSI-TRANSMITTING USER EQUIPMENT

CROSS-REFERENCE TO RELATED APPLICATION(S)

This application claims benefit of and priority to U.S. Provisional Application No. 62/899,617, filed Sep. 12, 2019, which is hereby assigned to the assignee hereof and hereby expressly incorporated by reference herein in its entirety as if fully set forth below and for all applicable purposes.

TECHNICAL FIELD

Aspects of the present disclosure relate to wireless communications, and more particularly, to techniques for managing channel state information (CSI) reporting by a user equipment (UE), such as between UEs via a sidelink channel.

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (for example, bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (for example, 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several innovative aspects, no single one of which is solely responsible for the desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved sidelink channel state information (CSI) reporting.

Aspects of the disclosure can be implemented in a method for wireless communication by a first wireless device. The method generally includes transmitting control information regarding at least one of scheduling or configuration of a CSI report to be transmitted by the first wireless device. The method generally includes generating the CSI report based on one or more CSI reference signals (CSI-RSs) received by the first wireless device. The method generally includes transmitting the CSI report in accordance with the control information.

Aspects of the disclosure can be implemented in a method for wireless communication by an apparatus. The method generally includes receiving, from a first wireless device, control information regarding at least one of scheduling or configuration of a CSI report to be transmitted by the first wireless device. The method generally includes transmitting one or more CSI-RSs to the first wireless device. The method generally includes receiving the CSI report, from the first wireless device, in accordance with the control information.

Aspects of the disclosure can be implemented in an apparatus for wireless communication by a first wireless device. The apparatus generally includes at least one processor configured to transmit control information regarding at least one of scheduling or configuration of a CSI report to be transmitted by the first wireless device. The at least one processor is configured to generate the CSI report based on one or more CSI-RSs received by the first wireless device. The at least one processor is configured to transmit the CSI report in accordance with the control information. The apparatus generally includes a memory coupled with the at least one processor.

Aspects of the disclosure can be implemented in an apparatus for wireless communication. The apparatus generally includes at least one processor configured to receive, from a first wireless device, control information regarding at least one of scheduling or configuration of a CSI report to be transmitted by the first wireless device. The at least one processor is configured to transmit one or more CSI-RSs to the first wireless device. The at least one processor is configured to receive the CSI report, from the first wireless device, in accordance with the control information. The apparatus generally includes a memory coupled with the at least one processor.

Aspects of the disclosure can be implemented in an apparatus for wireless communication. The apparatus generally includes means for transmitting control information regarding at least one of scheduling or configuration of a CSI report to be transmitted by the first wireless device. The apparatus generally includes means for generating the CSI report based on one or more CSI-RSs received by the first wireless device. The apparatus generally includes means for transmitting the CSI report in accordance with the control information.

Aspects of the disclosure can be implemented in an apparatus for wireless communication. The apparatus generally includes means for receiving, from a first wireless device, control information regarding at least one of scheduling or configuration of a CSI report to be transmitted by the first wireless device. The apparatus generally includes means for transmitting one or more CSI-RSs to the first wireless device. The apparatus generally includes means for receiving the CSI report, from the first wireless device, in accordance with the control information.

Aspects of the disclosure can be implemented in a computer readable medium storing computer executable code thereon for wireless communication. The computer readable medium generally includes code for transmitting control information regarding at least one of scheduling or configuration of a CSI report to be transmitted by the first wireless device. The computer readable medium generally includes code for generating the CSI report based on one or more CSI-RSs received by the first wireless device. The computer readable medium generally includes code for transmitting the CSI report in accordance with the control information.

Aspects of the disclosure can be implemented in a computer readable medium storing computer executable code thereon for wireless communication. The computer readable medium generally includes code for receiving, from a first wireless device, control information regarding at least one of scheduling or configuration of a CSI report to be transmitted by the first wireless device. The computer readable medium generally includes code for transmitting one or more CSI-RSs to the first wireless device. The computer readable medium generally includes code for receiving the CSI report, from the first wireless device, in accordance with the control information.

To the accomplishment of the foregoing and related ends, the one or more aspects comprise the features hereinafter fully described and particularly pointed out in the claims. The following description and the appended drawings set forth in detail some illustrative features of the one or more aspects. These features are indicative, however, of but a few of the various ways in which the principles of various aspects may be employed.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
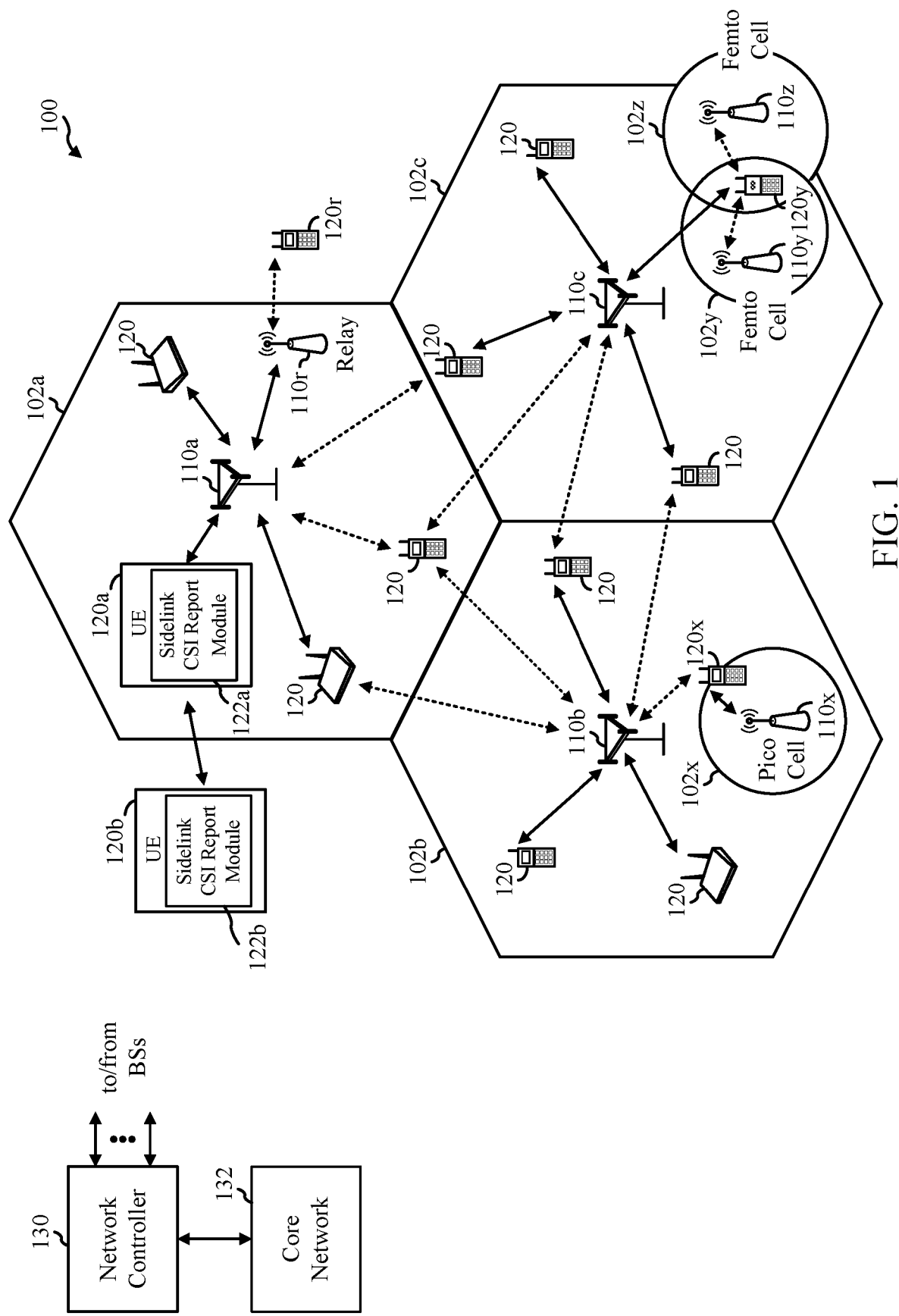
FIG. 1 shows an example wireless communication network in which some aspects of the present disclosure may be performed.

Aspects of the present disclosure provide apparatus, methods, processing systems, and computer readable mediums for managing channel state information (CSI) reporting, such as via a sidelink channel between sidelink devices (e.g., user equipment (UE)). As will be described, the techniques presented herein allow a CSI report transmitting UE to schedule and/or configure its own CSI report.

UEs may be configured to report some or all metrics for CSI reporting. Currently, there is no standalone reference signal (RS) transmission scheme dedicated to this type of CSI reporting for sidelink channels between devices. Allowing a UE to configure its own sidelink CSI report settings, as described herein, may allow the UE to tailor the metrics reported and/or resources to suit current conditions and needs. This flexibility may accommodate different sidelink use cases, which may have different requirements in terms of delay constraints, complexity of signaling, and overhead that can be tolerated for CSI feedback.

The following description provides examples of sidelink CSI report setting, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access (for example, 5G NR) may support various wireless communication services, such as enhanced mobile broadband (eMBB) targeting wide bandwidth, millimeter wave (mmWave) targeting high carrier frequency, massive machine type communications MTC (mMTC) targeting non-backward compatible MTC techniques, or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same time-domain resource (for example, a slot or subframe) or frequency-domain resource (for example, component carrier).

FIG. 1 illustrates an example wireless communication network 100 in which aspects of the present disclosure may be performed. For example, as shown in FIG. 1, UE 120a and/or UE 120b may include a Sidelink CSI Report Module (122a, 122b), that may be configured to perform operations to manage sidelink CSI reporting as described herein.

As shown in FIG. 1, the wireless communication network 100 may be in communication with a core network 132. The core network 132 may in communication with one or more base station (BSs) 110110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another or to one or more other BSs or network nodes (not shown) in wireless communication network 100 through various types of backhaul interfaces (for example, a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells.

The BSs 110 communicate with UEs 120 in the wireless communication network 100. The UEs 120 may be dispersed throughout the wireless communication network 100, and each UE 120 may be stationary or mobile. Wireless communication network 100 may also include relay stations (for example, relay station 110r), also referred to as relays or the like, that receive a transmission of data or other information from an upstream station (for example, a BS 110a or a UE 120r) and sends a transmission of the data or other information to a downstream station (for example, a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
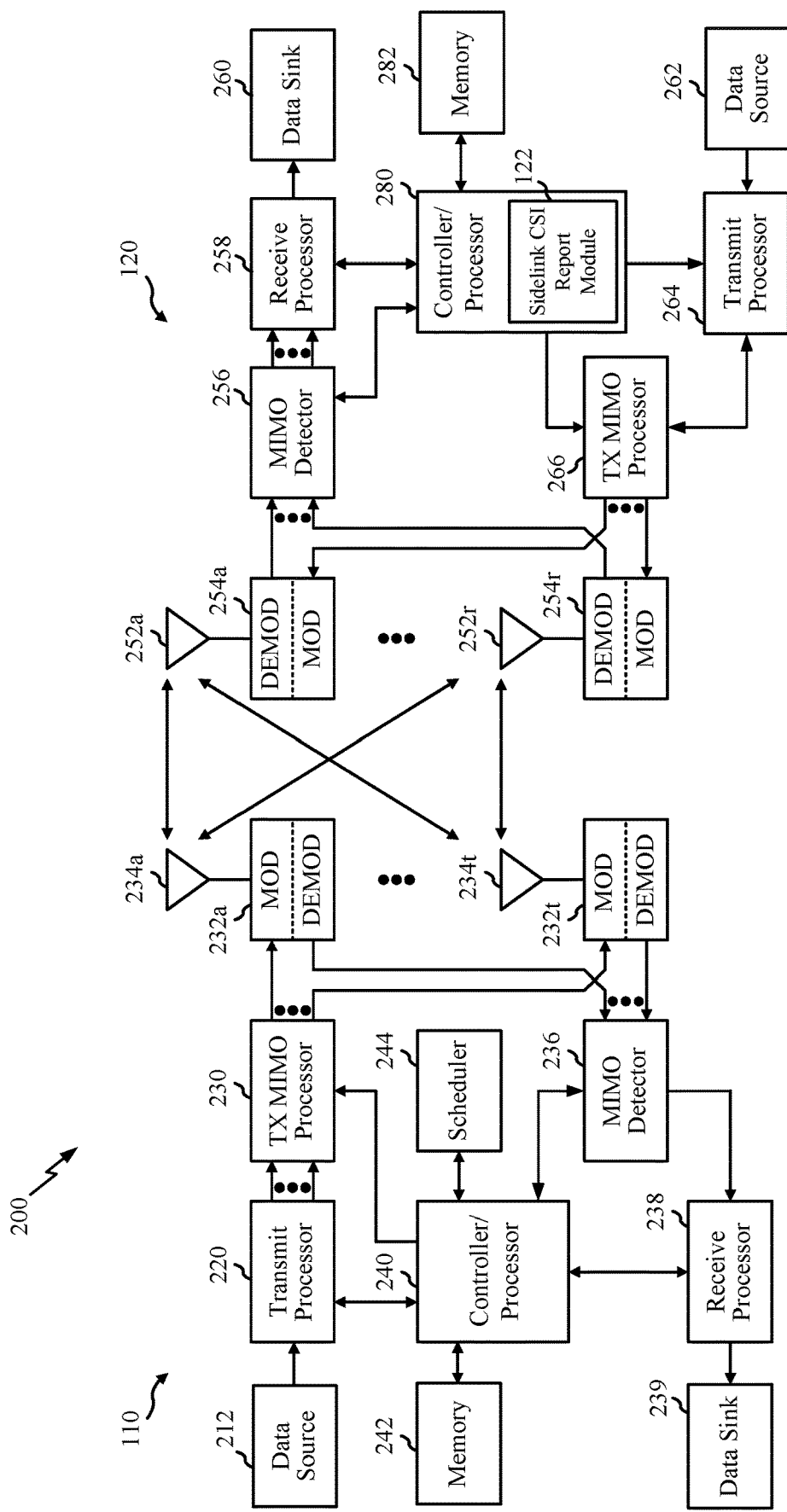
FIG. 2 shows a block diagram illustrating an example base station (BS) and an example user equipment (UE) in accordance with some aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (for example, precoding) on the data symbols, the control symbols, or the reference symbols, if applicable, and may provide output symbol streams to the modulators (MODs) in transceivers 232a-232t. Each modulator may process a respective output symbol stream (for example, for OFDM, etc.) to obtain an output sample stream. Each modulator may further process (for example, convert to analog, amplify, filter, and upconvert) the output sample stream to obtain a downlink signal. Downlink signals from the modulators in transceivers 232a-232t may be transmitted via the antennas 234a-234t, respectively.

At the UE 120a, the antennas 252a-252r may receive the downlink signals from the BS 110a (or sidelink signals from a sidelink device, such as UE 120b) and may provide received signals to the demodulators (DEMODs) in transceivers 254a-254r, respectively. Each demodulator may condition (for example, filter, amplify, downconvert, and digitize) a respective received signal to obtain input samples. Each demodulator may further process the input samples (for example, for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (for example, demodulate, deinterleave, and decode) the detected symbols, provide decoded data for the UE 120a to a data sink 260, and provide decoded control information to a controller/processor 280.

On the uplink or sidelink, at UE 120a, a transmit processor 264 may receive and process data (for example, for the physical uplink shared channel (PUSCH) or the physical sidelink shared channel (PSSCH)) from a data source 262 and control information (for example, for the physical uplink control channel (PUCCH) or physical sidelink control channel (PSCCH)) from the controller/processor 280. The transmit processor 264 may also generate reference symbols for a reference signal (for example, for the sounding reference signal (SRS) or channel state information reference signal (CSI-RS)). The symbols from the transmit processor 264 may be precoded by a TX MIMO processor 266 if applicable, further processed by the modulators in transceivers 254a-254r (for example, for SC-FDM, etc.), and transmitted to the BS 110a or sidelink UE 120b. At the BS 110a, the uplink signals from the UE 120a may be received by the antennas 234, processed by the demodulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110 and UE 120, respectively. A scheduler 244 may schedule UEs for data transmission on the downlink or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. As shown in FIG. 2, the controller/processor 280 of the UE 120a has a Sidelink CSI Report Module 122 that may be configured to configure/schedule UE 120s own CSI report and/or process a sidelink CSI report from another UE. Although shown at the Controller/Processor, other components of the UE may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
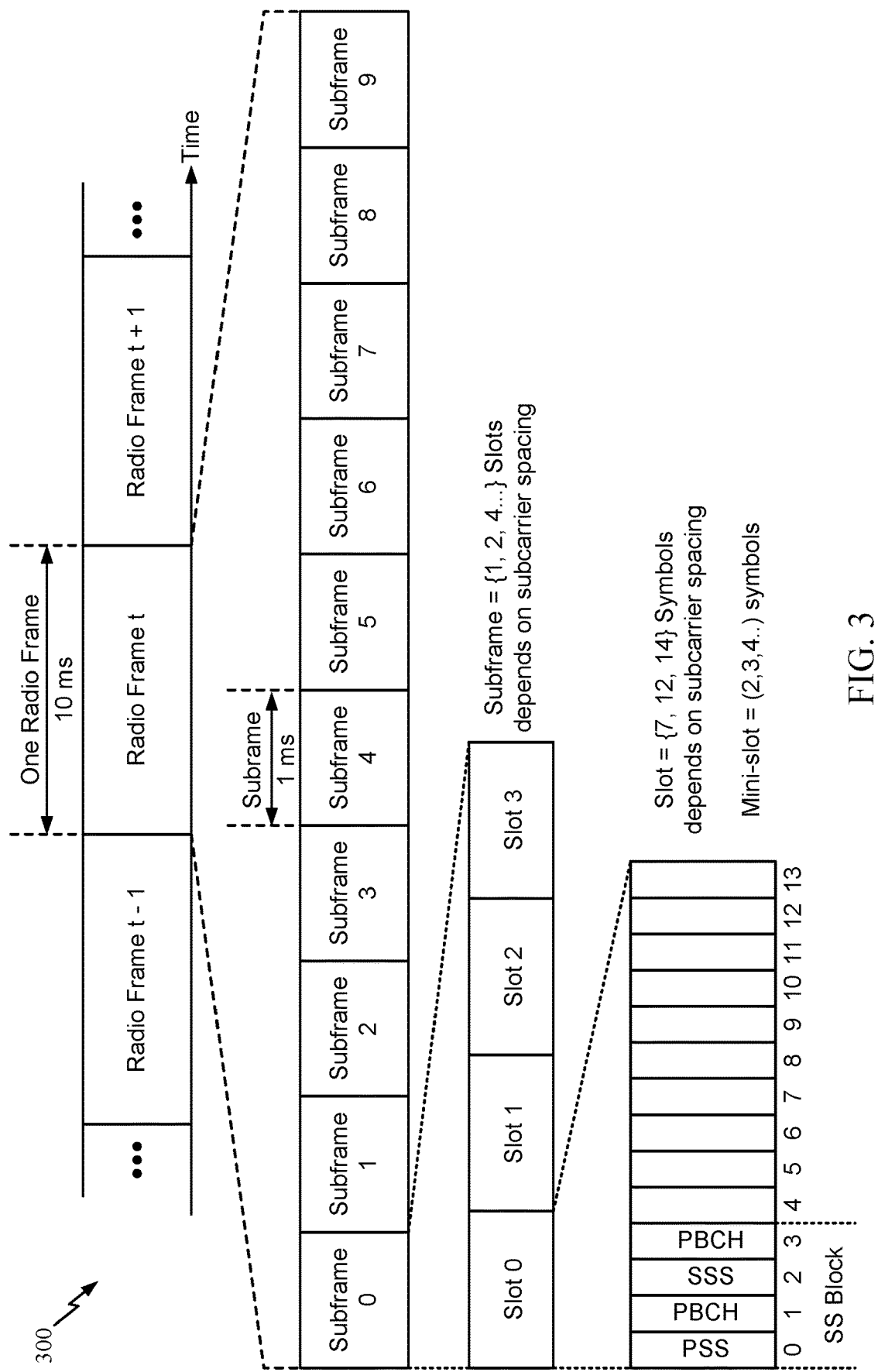
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In some circumstances, two or more subordinate entities (for example, UEs) may communicate with each other using sidelink signals. As described above, V2V and V2X communications are examples of communications that may be transmitted via a sidelink. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a sidelink may refer to a direct link between one subordinate entity (for example, UE1) and another subordinate entity (for example, UE2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed spectrum (unlike wireless local area networks, which typically use an unlicensed spectrum).

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as channel state information (CSI) related to a sidelink channel quality.

Figure 4:
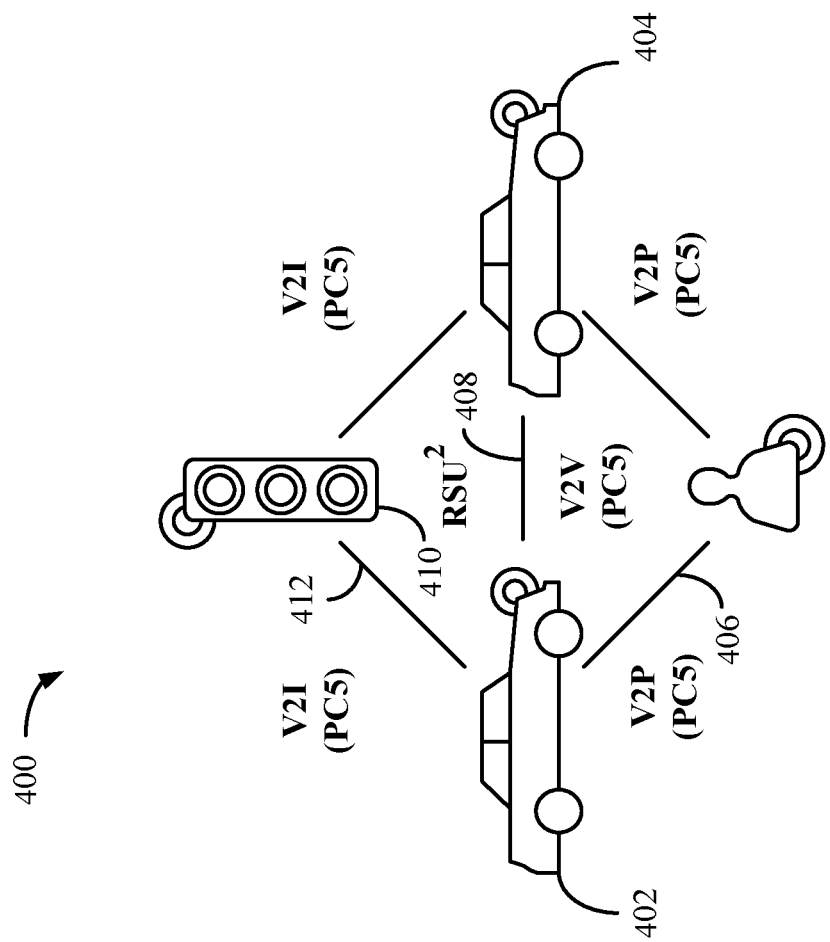
FIG. 4 illustrates an example vehicle-to-everything (V2X) communication system, in accordance with certain aspects of the present disclosure.
Figure 5:
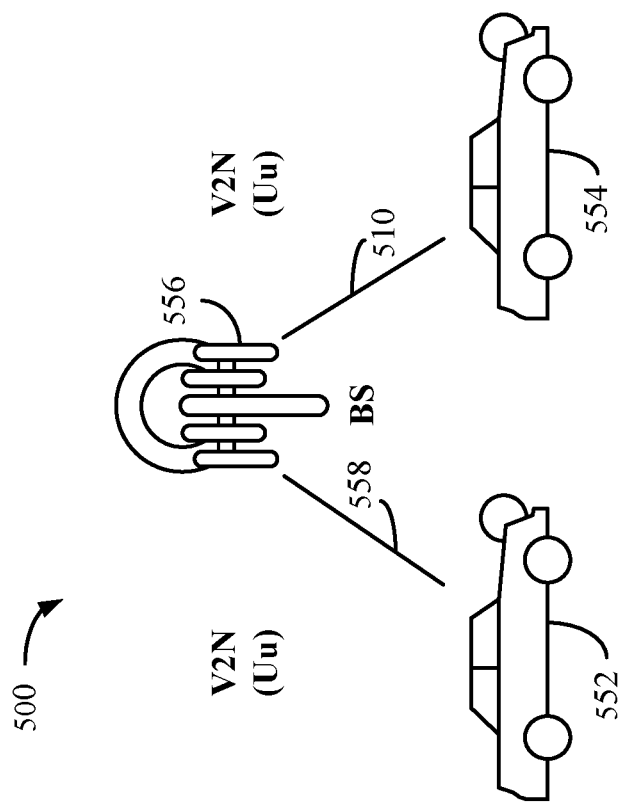
FIG. 5 illustrates another example V2X communication system, in accordance with certain aspects of the present disclosure.

FIG. 4 and FIG. 5 show diagrammatic representations of example vehicle to everything (V2X) systems in accordance with some aspects of the present disclosure. For example, the vehicles shown in FIG. 4 and FIG. 5 may communicate via sidelink channels and may perform sidelink CSI reporting as described herein.

The V2X systems, provided in FIG. 4 and FIG. 5 provide two complementary transmission modes. A first transmission mode, shown by way of example in FIG. 4, involves direct communications (for example, also referred to as side link communications) between participants in proximity to one another in a local area. A second transmission mode, shown by way of example in FIG. 5, involves network communications through a network, which may be implemented over a Uu interface (for example, a wireless communication interface between a radio access network (RAN) and a UE).

Referring to FIG. 4, a V2X system 400 (for example, including vehicle to vehicle (V2V) communications) is illustrated with two vehicles 402, 404. The first transmission mode allows for direct communication between different participants in a given geographic location. As illustrated, a vehicle can have a wireless communication link 406 with an individual (V2P) (for example, via a UE) through a PC5 interface. Communications between the vehicles 402 and 404 may also occur through a PC5 interface 408. In a like manner, communication may occur from a vehicle 402 to other highway components (for example, highway component 410), such as a traffic signal or sign (V2I) through a PC5 interface 412. With respect to each communication link illustrated in FIG. 4, two-way communication may take place between elements, therefore each element may be a transmitter and a receiver of information. The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 5 shows a V2X system 500 for communication between a vehicle 552 and a vehicle 554 through a network entity 556. These network communications may occur through discrete nodes, such as a BS (for example, an eNB or gNB), that sends and receives information to and from (for example, relays information between) vehicles 552, 554. The network communications through vehicle to network (V2N) links 558 and 510 may be used, for example, for long range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

Aspects of the present disclosure relate to channel state information (CSI) reporting between user equipments (UEs) via a sidelink channel.

CSI reporting configuration and scheduling in new radio (NR) may depend on the type of CSI reporting. The type of channel that carries the CSI report may depend on the type of CSI reporting. For example, periodic CSI reporting is carried on short physical uplink control channel (PUCCH) or long PUCCH, while semi-persistent (SP) CSI reporting is carried on long PUCCH or physical uplink shared channel (PUSCH). Resources and transmission parameters (such as modulation and coding scheme (MCS)) for SP CSI on PUSCH may be allocated semi-persistently using downlink control information (DCI). SP CSI may support Type II CSI reporting with minimum periodicity of 5 ms. In some cases, SP CSI reporting may not be supported for aperiodic CSI reference signals (CSI-RS) (although lack of support does not preclude one CSI report carried by multiple UL reporting instances). In NR, aperiodic CSI reporting is carried on PUSCH multiplexed with or without uplink data. Periodic and semi-persistent (P/SP) reporting in NR may support the following periodicities {5, 10, 20, 40, 80, 160, 320} slots.

CSI in NR includes a variety of channel quality metrics. For example, channel quality metrics may include Channel Quality Indicator (CQI); Precoding Matrix Indicator (PMI), channel state information reference signal (CSI-RS) Resource Indicator (CRI), Strongest Layer Indication (SLI), Rank Indication (RI), and L1 reference signal receive power (L1-RSRP) (for beam management).

For V2X deployments, such as described with reference to FIGS. 4 and 5, CSI reporting can be enabled and disabled by configuration. For flexibility, sidelink devices may be configured to report a subset of the channel quality metrics for CSI reporting. Currently, there is no standalone RS transmission scheme dedicated to this type of CSI reporting for sidelink channels between devices.

Currently, there is limited sidelink CSI reporting. For example, sidelink CSI-RS may support CQI and/or RI measurement for no more than two ports. Sidelink CSI-RS may be confined within the PSSCH. However, more detailed CSI reporting may be desirable for beam management and MIMO. Various sidelink use cases may involve different CSI reporting procedures (e.g., depending on the amount of required feedback and the available resources). There are differences between sidelink and conventional (Uu access link) CSI reporting. For example, CSI reporting is asymmetric on the Uu interface, where the gNB (in NR) schedules all CSI-RS and CSI reporting. In sidelink CSI reporting, however, the relation between transmitter and receiver is more symmetric (e.g., from one UE to another UE).

Thus, allowing a UE to configure its own CSI report settings, as described herein, is desirable for CSI reporting.

Example CSI Report Setting by the CSI-Transmitting UE

Aspects of the present disclosure provide channel state information (CSI) report setting by the CSI-transmitting user equipment (UE). This flexibility may accommodate the different use cases of sidelink, which may have different requirements in terms of delay constraints, complexity of signaling, and overhead that can be tolerated for CSI feedback. Enabling the UE to configure its own CSI report settings, as described herein, may allow the UE to tailor the metrics reported and/or resources to suit current conditions and needs.

Figure 6:
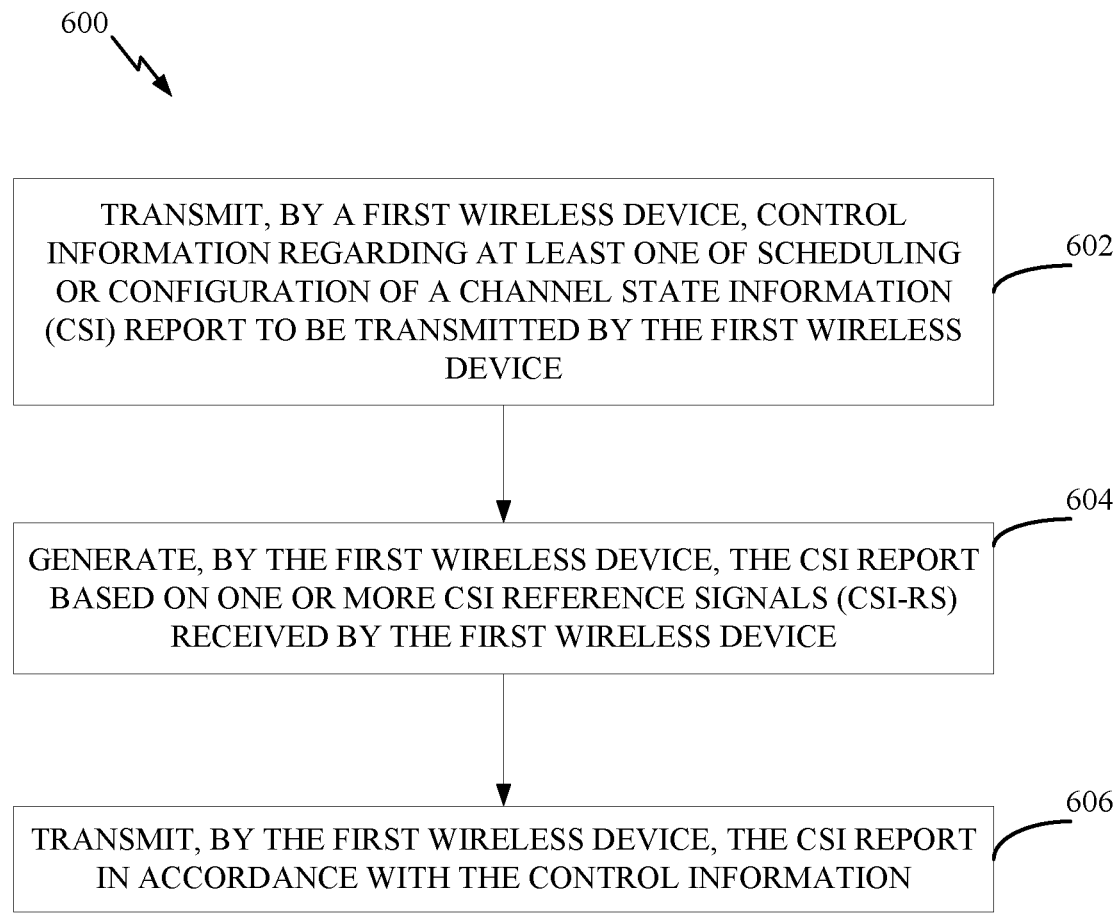
FIG. 6 is a flow diagram illustrating example operations for wireless communication by a first wireless device in accordance with some aspects of the present disclosure.

FIG. 6 is a flow diagram illustrating example operations 600 for wireless communication, in accordance with certain aspects of the present disclosure. The operations 600 may be performed, for example, by a first sidelink device, such as a UE (e.g., by a UE 120a of FIG. 1 to schedule and/or configure its own sidelink CSI report to a UE 120b). The operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 600 begin, at 602, by transmitting control information regarding at least one of scheduling or configuration of a CSI report to be transmitted by the first wireless device. For example, the control information may be sent to another UE via a sidelink channel and/or to a base station (e.g., a gNB) via an access link. At 604, the first wireless device generates the CSI report based on one or more CSI reference signals (CSI-RSs) received by the first wireless device. At 606, the first wireless device transmits the CSI report in accordance with the control information. For example, the first wireless device may transmit the CSI report to another UE via a sidelink and/or to a BS via an access link.

Figure 7:
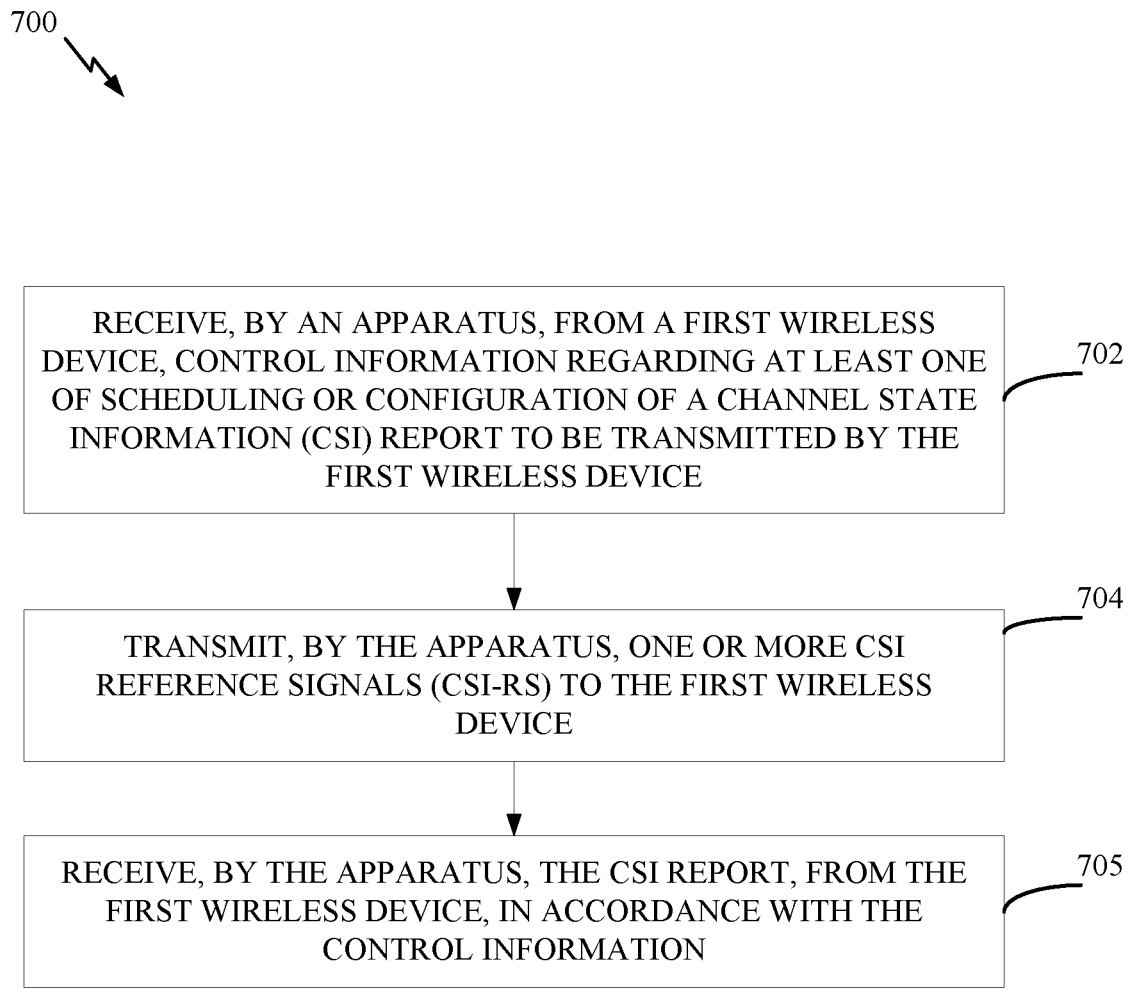
FIG. 7 is a flow diagram illustrating example operations for wireless communication by an apparatus in accordance with some aspects of the present disclosure.

FIG. 7 is a flow diagram illustrating example operations 700 for wireless communication, in accordance with certain aspects of the present disclosure. The operations 700 may be performed, for example, by an apparatus, such as a UE and/or a BS (e.g., by a UE 120b and/or a BS 110a of FIG. 1 to process a CSI report configured/scheduled by a UE 120a). The operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 700 begin, at 702, by receiving, from a first wireless device, control information regarding at least one of scheduling or configuration of a CSI report to be transmitted by the first wireless device. At 704, the apparatus transmits one or more CSI-RSs to the first wireless device. At 706, the apparatus receives the CSI report, from the first wireless device, in accordance with the control information.

Figure 8:
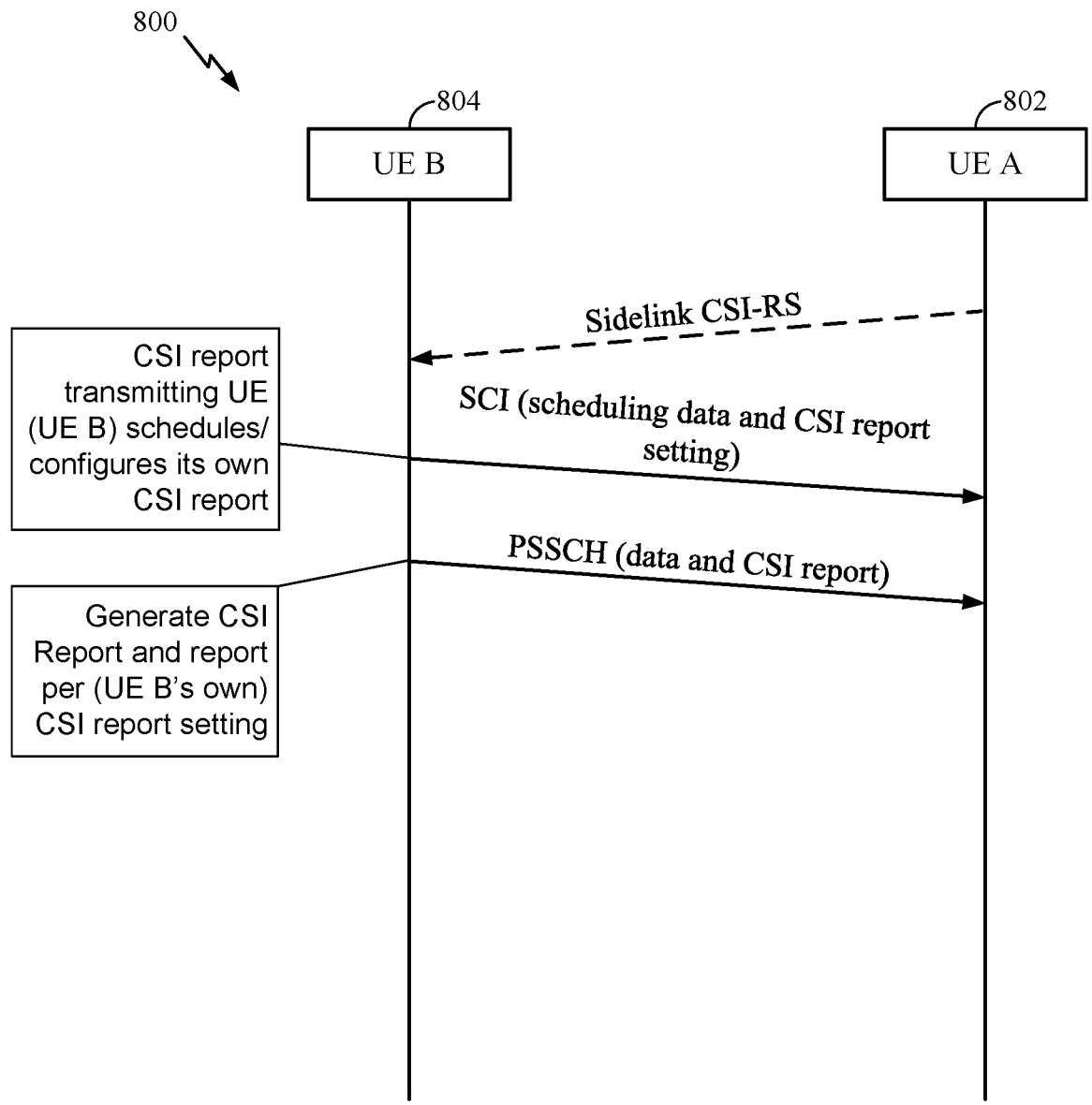
FIG. 8 is a call flow diagram illustrating example sidelink CSI report configuration and reporting for wireless communication in accordance with some aspects of the present disclosure.

Operations 600 and 700 of FIGS. 6 and 7 may be understood with reference to the call flow diagram of FIG. 8, which shows a UE B 804 that configures its own CSI report setting, in accordance with aspects described herein.

As illustrated, a UE A 802 transmits sidelink CSI-RS to UE B. In the illustrated example, UE B sends sidelink control information (SCI) scheduling data and the CSI report setting. As described in greater detail below, the SCI may configure/schedule the CSI reporting. For example, the SCI may indicate resources to be used for transmitting the CSI report and/or which metrics will be included therein. As shown in FIG. 8, UE B may then measure the CSI-RS, generate the CSI report, and send the CSI report (and possibly data) in a physical sidelink shared channel (PSSCH) transmission to UE A, in accordance with the CSI report setting.

As in the example shown in FIG. 8, in some cases, the CSI report setting may be configured dynamically by SCI. The SCI may be carried by physical sidelink control channel (PSCCH) between the UEs. In other cases, the CSI report settings may be semi-statically configured via a sidelink RRC configuration.

According to certain aspects, the CSI report setting may indicate one or more parameters for transmission of the CSI report on PSSCH, such as a beta factor, which may be included in the SCI. A beta factor (or factor \beta) for sidelink may be similar to the beta factor in 5G NR. The beta factor may modifies the transmit power when a PUSCH transmission carries an uplink control indictor (UCI). The beta factor may determine the number of resources for transmitting CSI report on PSSCH.

In some examples, the CSI report transmitting-UE may indicate separate resources for CSI reporting and data. For example, a first set of resources may be used for data and a second set of resources for CSI reporting.

In some examples, a physical sidelink broadcast channel (PSBCH) may be used to carry at least some CSI report setting configuration information. For example, resources and/or MCS for CSI reporting may be indicated by the PSBCH of the CSI transmitting-UE.

In some examples, the SCI may indicate only the presence of a CSI report in resources that are already configured. For example, the resources may already be configured by a gNB via the access link. In some examples, the resources may already configured by the CSI transmitting-UE by PSBCH. In either case, the SCI may only indicate a CSI report is being transmitted using these already configured resources.

While aspects of the present disclosure involve sidelink CSI reporting, in some examples, the UE may send control information and/or CSI reporting to a network entity (e.g., a base station (BS)).

As described herein, allowing a UE to configure its own CSI report settings may help the UE accommodate different requirements in terms of delay constraints, complexity of signaling, and overhead that can be tolerated for CSI feedback.

Figure 9:
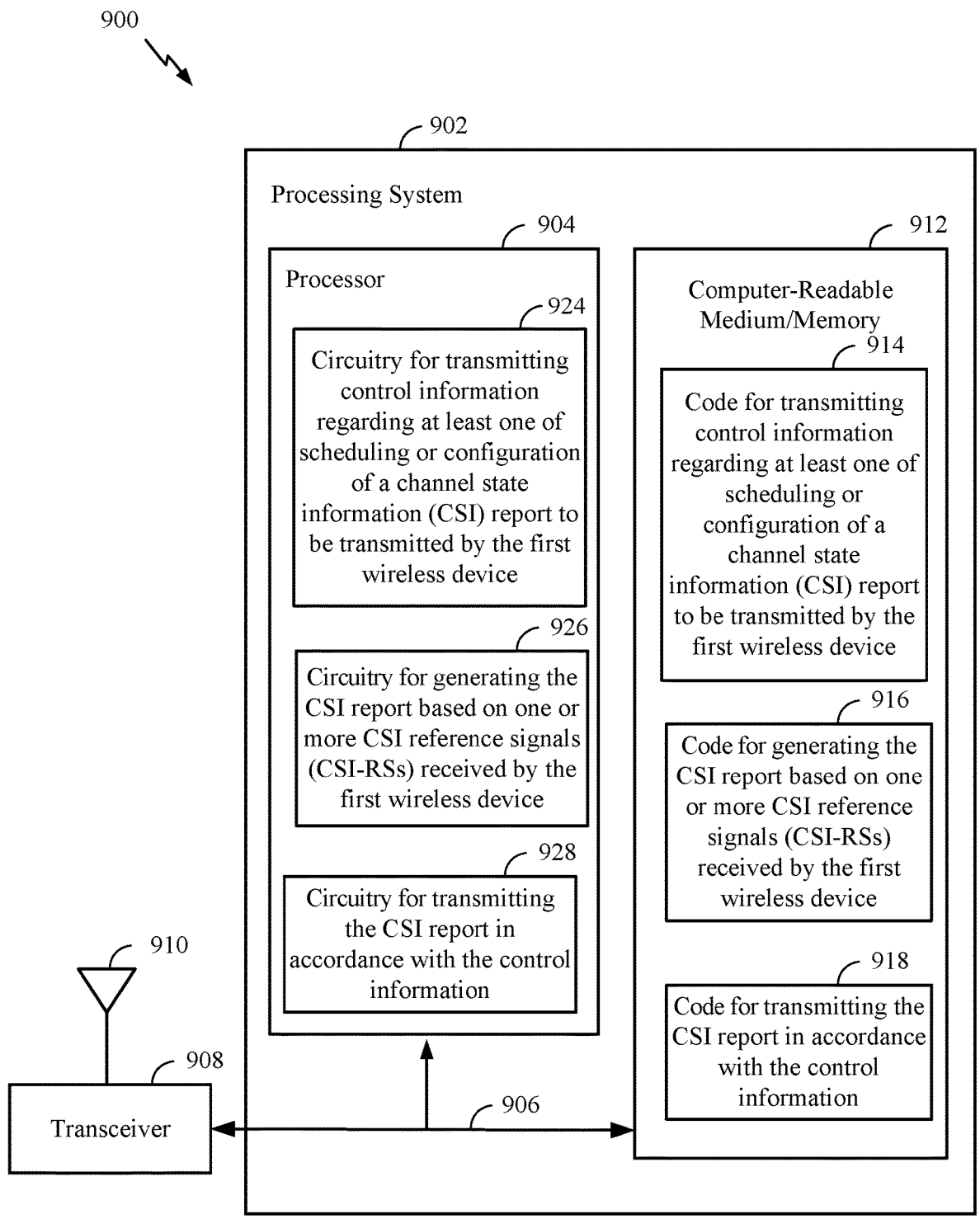
FIG. 9 is a block diagram illustrating an example communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIG. 6. The communications device 900 includes a processing system 902 coupled to a transceiver 908 (e.g., a transmitter and/or a receiver). The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 6, or other operations for performing the various techniques discussed herein for managing CSI reporting between UEs via a sidelink channel. In certain aspects, computer-readable medium/memory 912 stores code 914 for transmitting control information regarding at least one of scheduling or configuration of a CSI report to be transmitted by the first wireless device; code 916 for generating the CSI report based on one or more CSI-RSs received by the first wireless device; and code 918 for transmitting the CSI report in accordance with the control information. In certain aspects, the processor 904 has circuitry configured to implement the code stored in the computer-readable medium/memory 912. The processor 904 includes circuitry 924 for transmitting control information regarding at least one of scheduling or configuration of a CSI report to be transmitted by the first wireless device; circuitry 926 for generating the CSI report based on one or more CSI-RSs received by the first wireless device; and circuitry 928 for transmitting the CSI report in accordance with the control information.

Figure 10:
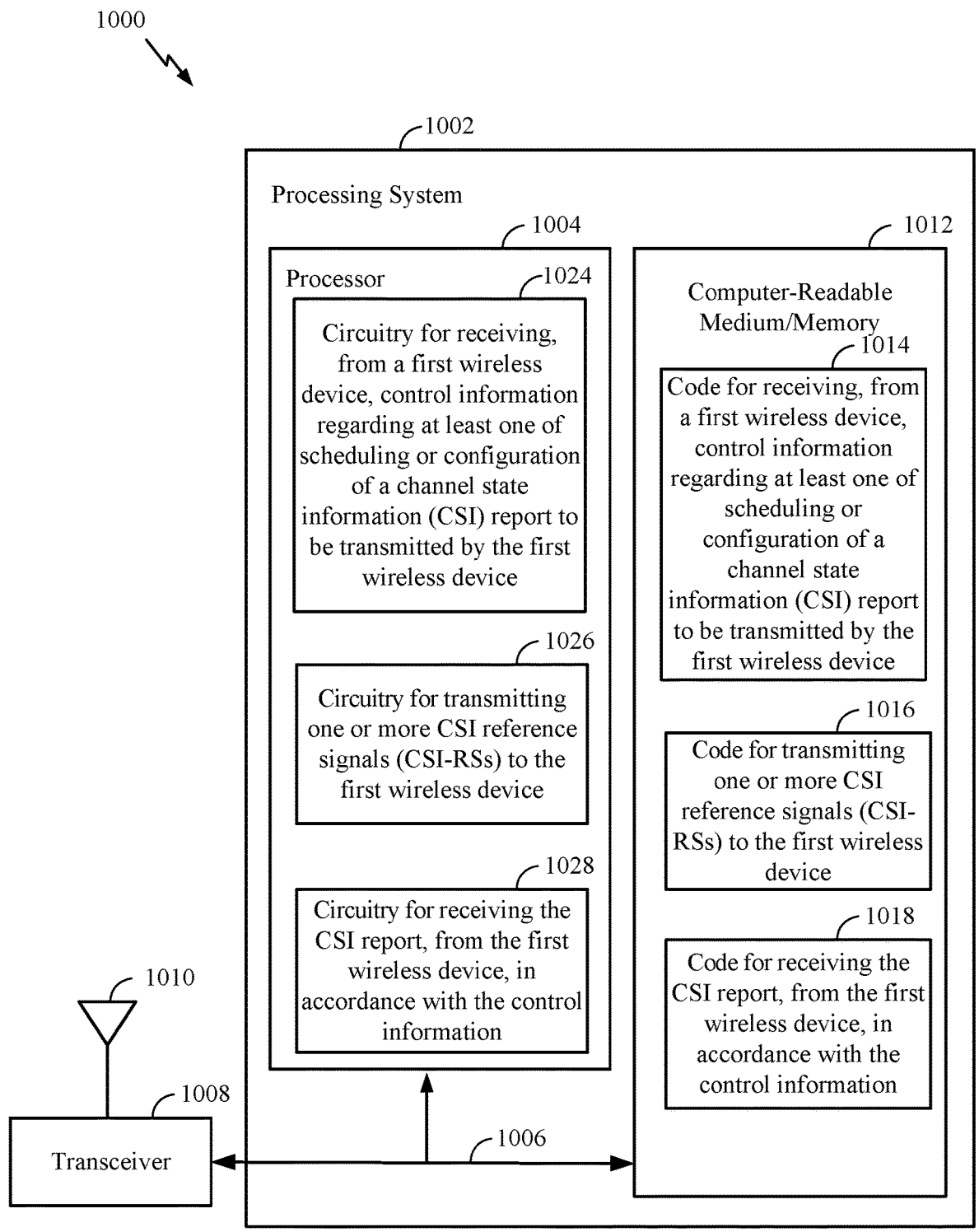
FIG. 10 is a block diagram illustrating an example communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 7. The communications device 1000 includes a processing system 1002 coupled to a transceiver 1008 (e.g., a transmitter and/or a receiver). The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 7, or other operations for performing the various techniques discussed herein for managing CSI reporting between UEs via a sidelink channel. In certain aspects, computer-readable medium/memory 1012 stores code 1014 for receiving, from a first wireless device, control information regarding at least one of scheduling or configuration of a CSI report to be transmitted by the first wireless device; code 1016 for transmitting one or more CSI-RSs to the first wireless device; and code 1018 for receiving the CSI report, from the first wireless device, in accordance with the control information. In certain aspects, the processor 1004 has circuitry configured to implement the code stored in the computer-readable medium/memory 1012. The processor 1004 includes circuitry 1024 for receiving, from a first wireless device, control information regarding at least one of scheduling or configuration of a CSI report to be transmitted by the first wireless device; circuitry 1026 transmitting one or more CSI-RSs to the first wireless device; and circuitry 1028 for receiving the CSI report, from the first wireless device, in accordance with the control information.

The techniques described herein may be used for various wireless communication technologies, such as NR (for example, 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, or other types of cells. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having an association with the femto cell (for example, UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (for example, a smart ring, a smart bracelet, etc.), an entertainment device (for example, a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (for example, a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (for example, one or more other UEs), and the other UEs may utilize the resources scheduled by the UE for wireless communication. In some examples, a UE may function as a scheduling entity in a peer-to-peer (P2P) network, or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" may encompass one or more of a wide variety of actions. For example, "determining" may include calculating, computing, processing, deriving, investigating, looking up (for example, looking up in a table, a database or another data structure), assuming and the like. Also, "determining" may include receiving (for example, receiving information), accessing (for example, accessing data in a memory) and the like. Also, "determining" may include resolving, selecting, choosing, establishing and the like.

As used herein, "or" is used intended to be interpreted in the inclusive sense, unless otherwise explicitly indicated.

For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. An apparatus of wireless communication by a first sidelink user equipment (UE), comprising:
   at least one processor configured to:
      transmit control information on a first sidelink channel to a second sidelink UE regarding at least one of scheduling or configuration of a channel state information (CSI) report to be transmitted by the first sidelink UE;
      generate the CSI report based on one or more CSI reference signals (CSI-RSs) received by the first sidelink UE from the second sidelink UE; and
      transmit the CSI report on a second sidelink channel to the second sidelink UE in accordance with the control information; and
   a memory coupled with the at least one processor.

2. The apparatus of claim 1, wherein the control information indicates one or more signal quality metrics to be included in the CSI report.

3. The apparatus of claim 1, wherein the control information indicates a beta factor that at least one of: modifies a transmit power for transmitting the CSI report on a physical sidelink shared channel (PSSCH), modifies the transmit power for transmitting the CSI report on a physical uplink shared channel (PUSCH), or determines a number of resources for transmitting the CSI report.

4. The apparatus of claim 1, wherein the control information indicates the CSI report is to be sent on resources separate than resources allocated for sending data.

5. The apparatus of claim 1, wherein the control information is transmitted via a sidelink radio resource control (RRC) configuration for semi-static scheduling or configuration of the CSI report.

6. The apparatus of claim 1, wherein one or more parameters for transmitting the CSI report are indicated via a sidelink broadcast channel.

7. The apparatus of claim 6, wherein the one or more parameters comprise at least one of: resources for transmitting the CSI report or a modulation and coding scheme (MCS) for transmitting the CSI report.

8. The apparatus of claim 1, wherein the control information is transmitted as sidelink control information (SCI).

9. The apparatus of claim 8, wherein the SCI indicates a presence of the CSI report in a pool of resources already configured for communication between the first sidelink UE and a second sidelink UE.

10. The apparatus of claim 9, wherein the pool of resources is configured by:
    a base station via an access link; or
    the first sidelink UE.

11. An apparatus of wireless communication, comprising:
    at least one processor configured to:
       receive, from a first sidelink user equipment (UE), control information on a first sidelink channel regarding at least one of scheduling or configuration of a channel state information (CSI) report to be transmitted by the first sidelink UE;
       transmit one or more CSI reference signals (CSI-RSs) to the first sidelink UE; and
       receive the CSI report from the first sidelink UE on a second sidelink channel, in accordance with the control information; and
    a memory coupled with the at least one processor.

12. The apparatus of claim 11, wherein the control information indicates one or more signal quality metrics to be included in the CSI report.

13. The apparatus of claim 11, wherein the control information indicates a beta factor that at least one of: modifies a transmit power for transmitting the CSI report on a physical sidelink shared channel (PSSCH), modifies the transmit power for transmitting the CSI report on a physical uplink shared channel (PUSCH), or determines a number of resources for transmitting the CSI report.

14. The apparatus of claim 11, wherein:
the control information indicates the CSI report is to be sent on resources separate than resources allocated for sending other data; and
the apparatus monitors the separate resources for the CSI report and data.

15. The apparatus of claim 11, wherein the apparatus comprises a second sidelink UE.

16. The apparatus of claim 15, wherein the control information is received as sidelink control information (SCI).

17. The apparatus of claim 16, wherein the SCI indicates a presence of the CSI report in a pool of resources already configured for communication between the first sidelink UE and a second sidelink UE.

18. The apparatus of claim 17, wherein the pool of resources is configured by:
a base station via an access link; or
the first sidelink UE.

19. The apparatus of claim 11, wherein the control information is received via a sidelink radio resource control (RRC) configuration for semi-static scheduling or configuration of the CSI report.

20. The apparatus of claim 11, wherein one or more parameters for transmitting the CSI report are received via a sidelink broadcast channel.

21. The apparatus of claim 20, wherein the one or more parameters comprise at least one of: resources for receiving the CSI report or a modulation and coding scheme (MCS) for receiving the CSI report.

22. A method of wireless communication by a first sidelink UE, the method comprising:
transmitting control information on a first sidelink channel to a second sidelink UE regarding at least one of scheduling or configuration of a channel state information (CSI) report to be transmitted by the first sidelink UE;
generating the CSI report based on one or more CSI reference signals (CSI-RSs) received by the first sidelink UE from the second sidelink UE; and
transmitting the CSI report on a second sidelink channel to the second sidelink UE in accordance with the control information.

23. The method of claim 22, wherein the control information indicates a beta factor that at least one of: modifies a transmit power for transmitting the CSI report on a physical sidelink shared channel (PSSCH), modifies the transmit power for transmitting the CSI report on a physical uplink shared channel (PUSCH), or determines a number of resources for transmitting the CSI report.

24. The method of claim 22, wherein the control information is transmitted as sidelink control information (SCI), wherein the SCI indicates a presence of the CSI report in a pool of resources already configured for communication between the first sidelink UE and a second sidelink UE.

25. A method of wireless communication by an apparatus, the method comprising:
receiving, from a first sidelink UE, control information on a first sidelink channel regarding at least one of scheduling or configuration of a channel state information (CSI) report to be transmitted by the first sidelink UE;
transmitting one or more CSI reference signals (CSI-RSs) to the first sidelink UE; and
receiving the CSI report from the first sidelink UE on a second sidelink channel, in accordance with the control information.

26. The method of claim 25, wherein the control information indicates a beta factor that at least one of: modifies a transmit power for transmitting the CSI report on a physical sidelink shared channel (PSSCH), modifies the transmit power for transmitting the CSI report on a physical uplink shared channel (PUSCH), or determines a number of resources for transmitting the CSI report.

27. The method of claim 25, wherein
the apparatus comprises a second sidelink UE.

28. The method of claim 27, wherein the control information is as sidelink control information (SCI).

\* \* \* \* \*